United States Patent
Ohata et al.

(10) Patent No.: US 7,435,006 B2
(45) Date of Patent: Oct. 14, 2008

(54) PULLEY BEARING FOR ENGINE AUXILIARES

(75) Inventors: Toshihisa Ohata, Kanagawa (JP); Hiroshi Ishiguro, Kanagawa (JP)

(73) Assignee: NSK Ltd., Tokyo (JP)

( * ) Notice: Subject to any disclaimer, the term of this patent is extended or adjusted under 35 U.S.C. 154(b) by 778 days.

(21) Appl. No.: 10/504,169

(22) PCT Filed: Feb. 6, 2003

(86) PCT No.: PCT/JP03/01249

§ 371 (c)(1),
(2), (4) Date: Aug. 11, 2004

(87) PCT Pub. No.: WO03/069175

PCT Pub. Date: Aug. 21, 2003

(65) Prior Publication Data

US 2005/0041899 A1    Feb. 24, 2005

(30) Foreign Application Priority Data

Feb. 12, 2002  (JP) .................... 2002-033269
Mar. 29, 2002  (JP) .................... 2002-097966
Dec. 10, 2002  (JP) .................... 2002-358783

(51) Int. Cl.
*F16C 33/58* (2006.01)

(52) U.S. Cl. .................... 384/493; 384/512; 384/513; 384/905

(58) Field of Classification Search ........... 384/492, 384/493, 512, 513, 905

See application file for complete search history.

(56) References Cited

U.S. PATENT DOCUMENTS

| 1,394,110 | A |   | 10/1921 | Nelson |
|---|---|---|---|---|
| 4,808,014 | A | * | 2/1989 | Ueda et al. .................. 384/492 |
| 5,176,456 | A | * | 1/1993 | Takebayashi et al. ....... 384/493 |
| 5,484,213 | A |   | 1/1996 | Caillaut et al. |
| 5,642,797 | A |   | 7/1997 | Wall |
| 6,010,420 | A |   | 1/2000 | Niki et al. |
| 6,273,230 | B1 |   | 8/2001 | Nakano et al. |
| 2001/0038727 | A1 |   | 11/2001 | Miyazaki et al. |

FOREIGN PATENT DOCUMENTS

| DE | 41 07 976 A1 | 9/1992 |
|---|---|---|
| DE | 196 33 699 A1 | 2/1997 |
| EP | 1 471 270 A1 | 10/2004 |
| JP | 56-101417 A | 8/1981 |

(Continued)

*Primary Examiner*—William C Joyce
(74) *Attorney, Agent, or Firm*—Sughrue Mion, PLLC

(57) ABSTRACT

A bearing in which the thickness of the bottom of at least one of the inner ring and the outer ring is 50% or more of the diameter of the balls. Further, the bearing includes an outer ring having an outer diameter of 65 mm or less and balls having a diameter of 4 mm or less and has a width dimension of 45% or less of the inner diameter dimension thereof wherein the pitch diameter of the balls is closer to the outer side of the bearing than to the center of the section of the bearing. The outer side of the outer raceway grooves is tapered, and the inner side of angularly arranged outer raceway grooves is positioned closer to the central axis of the bearing than to the outer side of the outer raceway grooves.

4 Claims, 6 Drawing Sheets

FOREIGN PATENT DOCUMENTS

| | | |
|---|---|---|
| JP | 58-18151 U | 2/1983 |
| JP | 1-188715 A | 7/1989 |
| JP | 3-33221 U | 4/1991 |
| JP | 4-42921 U | 4/1992 |
| JP | 2508400 Y2 | 5/1996 |
| JP | 11-210766 A | 8/1999 |
| JP | 11-336795 A | 12/1999 |
| JP | 2000-240663 A | 9/2000 |
| JP | 2001-124073 * | 5/2001 |

* cited by examiner

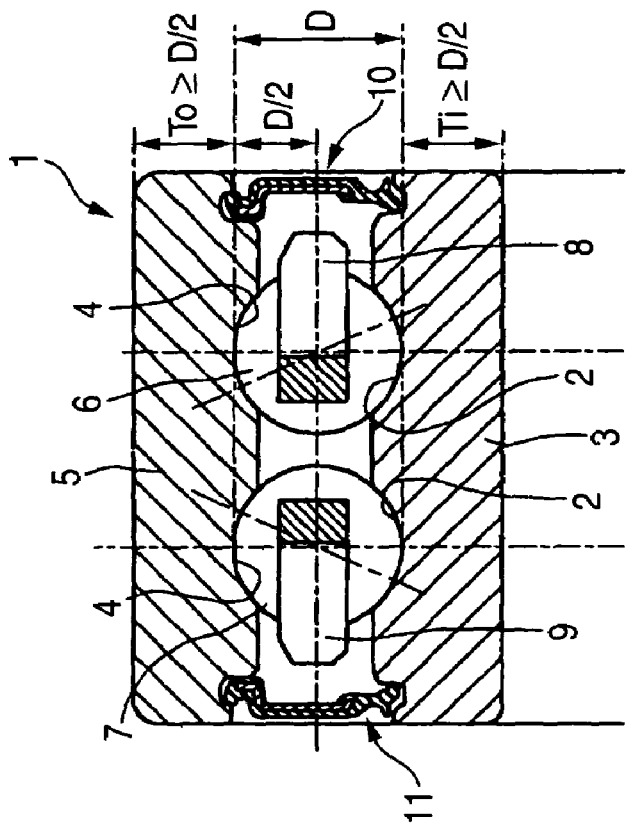
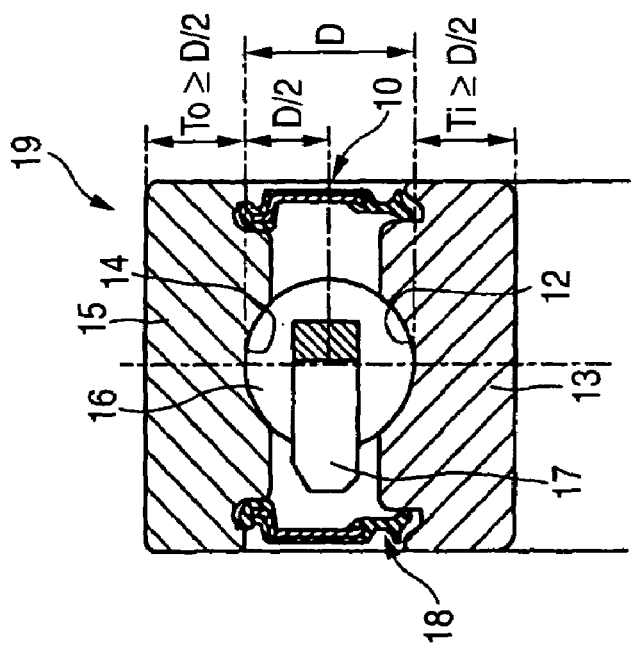

PULLEY BEARING FOR ENGINE AUXILIARES

TECHNICAL FIELD

The present invention relates to a bearing for bearing a pulley provided in an engine auxiliary such as automobile air conditioner compressor during the driving of the engine auxiliary by an engine via an endless belt and more particularly to a bearing for pulley of engine auxiliary capable of preventing adverse effects caused by the change of clearance in the bearing generated by the thermal expansion of fixed members of bearing, etc.

BACKGROUND ART

An automobile has various auxiliaries driven by an engine, and one of these auxiliaries is an air conditioner compressor and an endless belt extends between a driven pulley provided on the end of the rotary shaft of the compressor and a driving pulley of the engine so that the compressor is operated. An example of such a compressor is shown in FIG. 4.

In a compressor 51 for vehicle compressor shown in FIG. 6, a piston 54 is disposed in a plurality of cylinders 53 formed in a casing 52 in such an arrangement that it can move back and forth, and a swash plate 56 is slidably clamped between semicircular shoes 55, 55 provided opposed to each other on the base of the piston so that the piston 54 moves back and forth when the swash plate 56 is rotated. Thus, in order to allow the piston 54 to smoothly slide in the cylinder 53 formed in the casing 52 and reduce the weight of the compressor 51, the casing is mostly made of an aluminum alloy such as high silicon material content aluminum alloy.

A pin 78 provided at the end of an arm 57 fixed to the swash plate 56 is fitted in an ellipsoidal hole 62 provided in a rotary driving member 61 which rotates integrally with the rotary shaft 60, and a sleeve 63 having a spherical surface is fitted on the rotary shaft 60 so that it is energized in the axial direction by a spring 59 and rotatably supports the swash plate 56 on the periphery thereof.

As in the compressor 51, there may be provided a variable volume pump comprising a pressure-sensitive member 49 which expands or shrinks according to the pressure in a suction chamber 64 to open or close valve so that the balance pressure against the back surface of the piston 54 is adjusted by the suction pressure of the compressor to allow the inclination angle of the swash plate 56 to change according to the balance pressure and hence adjust the stroke of the piston 54, keeping the suction pressure constant.

In the compressor 51 shown in FIG. 6, an electromagnetic clutch 65 is provided, a leaf spring 67 is fixed to a mounting bracket 66 provided on the end of the rotary shaft 60, and the leaf spring 67 has an annular plate 68 made of a magnetic material fixed to the peripheral forward end thereof. In the embodiment shown, a driven pulley 73 having a U-shaped section is supported on the periphery of a supporting axis portion 71 protruding from an end casing 70 of the compressor 51 via a bearing 72.

In the space having a U-shaped section is disposed a solenoid 74 fixed to the end casing 70, and the aforementioned annular plate 68 made of a magnetic material is disposed opposed to the solenoid 74 with an annular wall 75 of the driven pulley 73. Further, as the aforementioned bearing 72 there is normally used a bearing for vehicle compressor pulley having an outer diameter of 65 mm or less or optionally a bearing with seal having a grease enclosed therein.

As mentioned above, the casing 52 is made of an aluminum alloy, and the end casing 70 is similarly made of an aluminum alloy to reduce the weight thereof, and accordingly, the supporting axis 71 on which the inner ring 69 of the bearing 71 is fitted is made of an aluminum alloy.

In the electromagnetic clutch 65 shown in FIG. 6, when the solenoid 74 is not energized, the aforementioned annular plate 68 is positioned apart from the annular wall 75 of the driven pulley 73 as shown so that even when the driven pulley 73 is rotated by the endless belt, the annular plate 68 does not rotate and the compressor 51 does not operate accordingly. On the contrary, when the solenoid 74 is energized, the resulting magnetic force causes the solenoid 74 to attract the annular plate 68 made of a magnetic material so that the annular wall 75 is pressed against the annular wall 75 of the driven pulley 73. In this manner, the electromagnetic clutch 65 is in connected state so that when the driven pulley 73 rotates, the annular plate 68 rotates integrally therewith to rotate the swash plate 56 via the leaf spring 67, the mounting bracket 66 and the rotary shaft 60 as mentioned above, causing the piston 54 to move back and forth to operate the compressor 51.

As the bearing 72 which bears the driven pulley 73 for rotating the rotary shaft 60 of said compressor 51 rotatably relative to the casing there has been heretofore used any of various types of bearings, but a double-row angular bearing is often used to prevent the frequent imposition of unbalanced load on the driven pulley 73 by the belt resulting in the discrepancy and oblique disposition of the central axis of the inner ring 69 and the outer ring 79 of the bearing.

As mentioned above, in the bearing for automobile compressor pulley, the portion on which the inner ring is fitted is mostly an axis-shaped portion protruding from the casing of the compressor, and in the embodiment shown in FIG. 6, it is a supporting axis 71 protruding from the end casing 70. Accordingly, the supporting axis 71 is a part of the member constituting the casing and is therefore made of a light alloy such as aluminum alloy. Further, the portion in which the outer ring of the bearing is fitted is mostly a driven pulley which is made of iron. Moreover, the driven pulley is sometimes made of resin in recent years.

On the contrary, since the bearing is subject to great load developed when the compressor is driven and must rotatably bear the compressor in a stable manner over an extended period of time, it must be made of a bearing steel having a high strength and have its races properly surface-treated. Therefore, it is inevitable that the bearing and the member on which the inner ring and the outer ring of the bearing are fitted must be made of different materials.

In particular, while most light alloys such as aluminum alloy have a great linear expansion coefficient, the bearing steel has a relatively small linear expansion coefficient, and since the recent rise of the internal temperature of engine room and the temperature during bearing operation cause the rise of the ambient temperature of the bearing and hence the expansion of the range of the working temperature of the bearing, the difference in linear expansion coefficient between the two materials has given a great problem.

In other words, in the case where the compressor pulley is born by the casing of the compressor via a bearing, when the inner ring 69, for example, is fitted on the supporting axis 71 protruding from the end casing 70 with a conventional degree of interference, the supporting axis 71 expands greater than the inner ring 69 when the temperature is higher than expected, developing an extremely great force pressing against the interior of the inner ring. Therefore, the inner ring is deformed to increase its diameter, causing gradual decrease of initial clearance which is the bearing clearance predetermined at assembly and eventually rolling of balls compressed between the inner ring and the outer ring, i.e., negative value of so-called running clearance. Further, the negative value gradually increases with said temperature rise.

When the running clearance is negative as mentioned above, the races on the inner ring and the outer ring and the surface of the balls gradually undergo damage and short life due to fatigue and temperature rise accompanying prolonged operation and this is extremely undesirable. When the looseness of fitting of the shaft with the bearing is raised to cope with this problem, relative slippage occurs between the inner ring and the supporting axis to disable proper bearing action and generate noise at low temperature because the connecting force of the two parts is small.

Further, as a countermeasure for preventing the aforementioned running clearance from being negative, it can be proposed that the initial clearance of the bearing is predetermined greater in expectation of reduction of clearance. In this case, however, a great clearance occurs in the bearing during low temperature operation, causing the general formula of great noise, and this is undesirable.

On the other hand, for the outer ring 79 of the bearing, the driven pulley 73 in which the outer ring 79 is fitted is sometimes made of a material having a greater linear expansion coefficient than that of the outer ring, and in recent years, a pulley made of resin is sometimes used. Accordingly, when the expansion of the driven pulley becomes great particularly during high temperature operation, the interference of the outer ring which has been initially assembled to the driven pulley with a predetermined interference is gradually lost, causing slippage relative to each other. As a counter measure for coping with this problem, it can be proposed that the interference during the assembly of the driven pulley and the bearing is sufficiently raised, making it possible to sufficiently maintain the connecting force between the two parts and hence prevent the occurrence of slippage relative to each other even during high temperature operation.

However, when such a great interference is predetermined, a great external force is acted on the outer ring to deform the outer ring, and in a bearing which has been predetermined to a certain initial clearance, the outer ring is provided with a clearance decreased by the inward deformation, occasionally making the initial clearance negative and hence causing trouble during low temperature operation to disadvantage. Further, since the linear expansion coefficient of the material is great, an extreme negative clearance occurs at an extremely low temperature, causing problems such as excess torque and dent on the bearing race. Moreover, the rise of the initial clearance for the purpose of preventing this problem causes the rise of clearance at high temperature resulting in the generation of noise. This trouble is not limited to bearing for automobile compressor pulley but can apply to pulley bearings for other various engine auxiliaries.

Accordingly, a first object of the present invention is to provide a bearing for pulley of engine auxiliary which can prevent the excessive reduction of running clearance caused by the expansive deformation of the inner ring by the expansion of the mounting member side thereof at high temperature even if the linear expansion coefficient of the inner ring of the bearing and the member on which the inner ring is fitted differ greatly from each other, can prevent the generation of noise at low temperature when the initial clearance of the bearing is raised to cope with this problem, can prevent the occurrence of slippage of the outer ring relative to the mounting member due to the reduction of interference of the bearing caused by the increase of the inner diameter of the outer ring by the expansion on the mounting member side thereof a thigh temperature even if the linear expansion coefficient of the outer ring of the bearing and the member in which the outer ring is fitted differ greatly from each other and can prevent the excessive reduction of initial clearance caused by the shrinkage deformation of the outer ring developed when the interference has been previously raised to cope with the reduction of interference or by the shrinkage of the outer ring at extremely low temperature. Further, a second object of the present invention is to solve problems that occur when some means for solving said problems are employed and hence provide a more complete bearing for pulley of engine auxiliary.

DISCLOSURE OF THE INVENTION

In order to solve said first problem, the present invention concerns a bearing for pulley of engine auxiliary comprising a pair of bearing rings consisting of an inner ring having an inner raceway groove provided on an outer surface thereof and an outer ring having an outer raceway groove provided on an inner surface thereof and balls disposed between said inner raceway groove and said outer raceway groove, wherein at least one of said pair of bearing rings is fixed to a member having a greater linear expansion coefficient than that of the bearing material and the thickness of the bottom of said bearing ring fixed to said member is 50% or more of the diameter of said balls.

Further, in order to solve the second problem, the present invention concerns a bearing for pulley of engine auxiliary comprising an outer ring having an outer diameter of 65 mm or less and a plurality of rows of outer raceway grooves provided on an inner surface thereof, an inner ring having a plurality of rows of inner raceway grooves provided on an outer surface thereof, balls having a diameter of 4 mm or less disposed between each of the inner raceway grooves of said inner ring and each of the outer raceway grooves of said outer ring, a retainer retaining the balls on each of said rows and a seal sealing the interior of the bearing, wherein the width dimension of the bearing is 45% or less of the inner diameter dimension of the bearing, the thickness of the bottom of at least one of said inner ring and said outer ring is 50% or more of the diameter of said balls, at least one of said inner ring and said outer ring is fixed to a member having a greater linear expansion coefficient than that of the bearing material, and there is employed at least one of means consisting of arrangement that a pitch diameter of the balls is closer to the outer diameter of the bearing than to the center of the section of the bearing, arrangement that said bearing material is EP steel having an oxygen content of 6 ppm or less, arrangement that the outer side of said outer raceway groove in the width direction of the bearing is tapered, arrangement that the inner side of said angularly arranged outer raceway grooves in the width direction of the bearing is positioned closer to inside the central axis of the bearing than to the outer side of said outer raceway grooves in the width direction of the bearing, arrangement that beveling of the outer back side of said retainer is more than half the section width of said retainer and arrangement that a seal having a plurality of lips fitted in an inner ring seal groove provided on said inner ring is provided.

BRIEF DESCRIPTION OF THE DRAWINGS

FIG. 1 is a sectional view of an example of the present invention wherein FIG. 1(a) is a diagram of the application of the present invention to a double-row bearing and FIG. 1(b) is a diagram of the application of the present invention to a single-row bearing.

FIG. 4 is a sectional view of the second example of the present invention wherein FIG. 4(a) is a partly enlarged sectional view and FIG. 4(b) is an enlarged sectional view of a part of FIG. 4(a).

Figure 2:
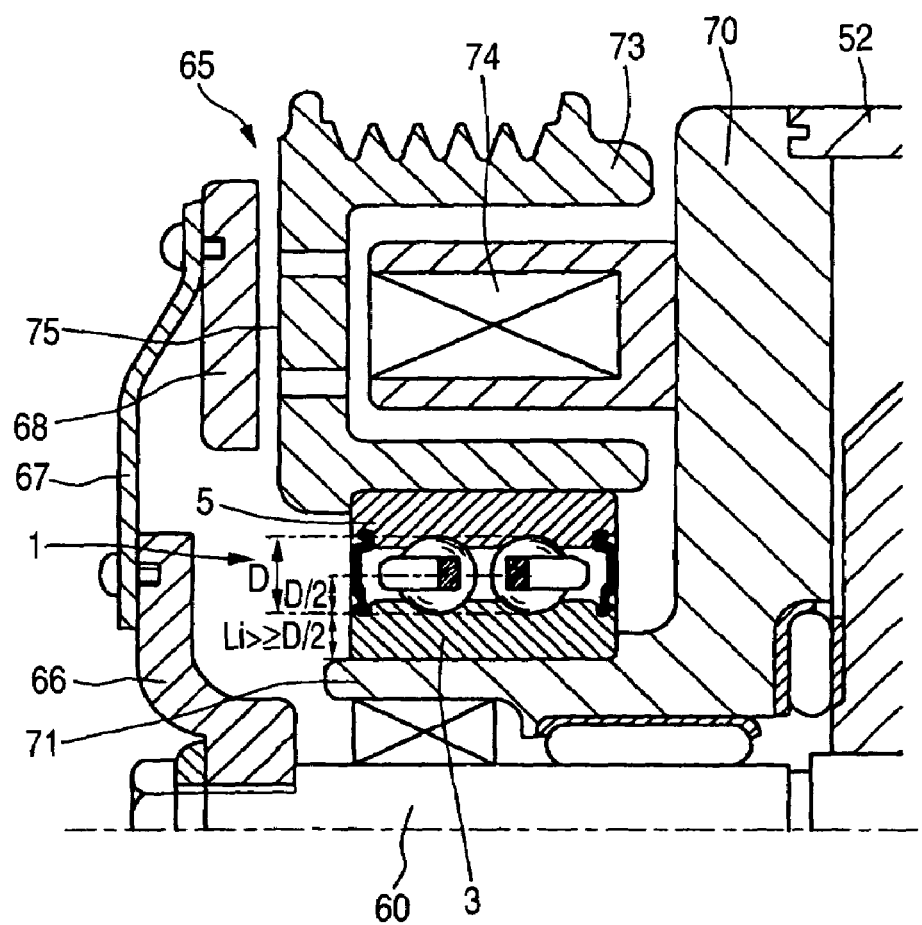
FIG. 2 is a sectional view illustrating an example of the application of the present invention to a double-row bearing which is used as a bearing for pulley of automobile compressor with electromagnetic clutch.

In the drawings, the reference numeral 1 indicates a double-row bearing, the reference numeral 2 indicates an inner raceway groove, the reference numeral 3 indicates an inner ring, the reference numeral 4 indicates an outer raceway groove, the reference numeral 5 indicates an outer ring, the reference numerals 6, 7 each indicate a ball, the reference numerals 8, 9 each indicate a retainer, the reference numerals 10, 11 each indicate a seal, the reference numeral 12 indicates a race surface, the reference numeral 13 indicates an inner ring, the reference numeral 14 indicates a race surface, the reference numeral 15 indicates an outer ring, the reference numeral 16 indicates a ball, the reference numeral 17 indicates a retainer, and the reference numeral 18 indicates a seal.

BEST MODE FOR CARRYING OUT THE INVENTION

Figure 6:
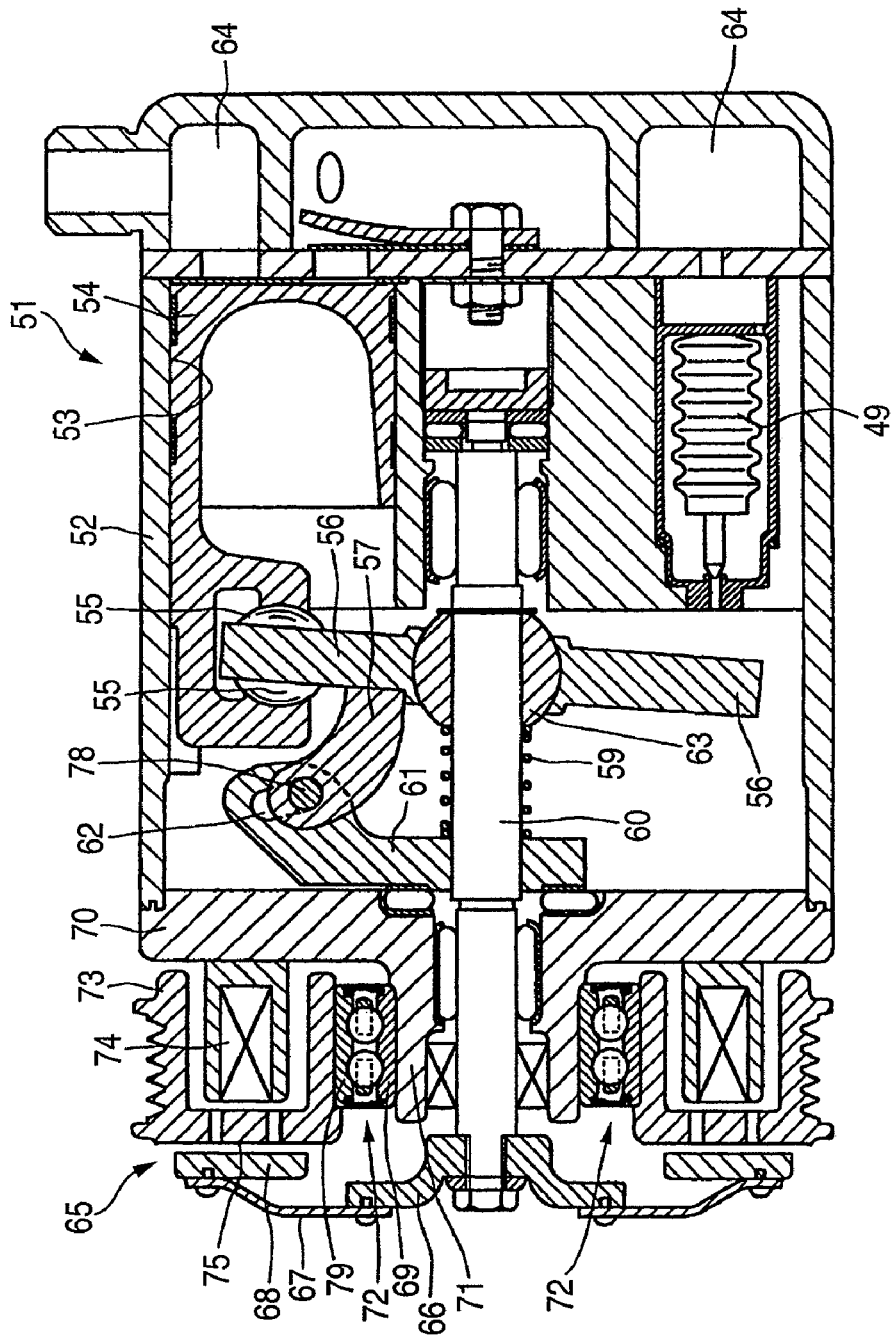
FIG. 6 is a sectional view illustrating the entire configuration of a related art automobile compressor.

Embodiments of implementation of the present invention will be described in connection with the drawings and with reference to the results of experiments. There are various kinds of air conditioner compressors as automobile auxiliaries, and a compressor 51 as shown in FIG. 6 above is used for example, wherein a driven pulley 73 which drives a rotary shaft 60 is born by a bearing 72 at a bearing portion 71 protruding from an end casing 70. An enlarged view of a part including the driven pulley 73 and the bearing portion bearing the driven pulley 73 is shown in FIG. 2.

FIG. 2 shows an example of the application of a bearing comprising thicker inner ring and outer ring according to the present invention to a double-row bearing instead of a related art bearing 72 shown in FIG. 6 as described later. Accordingly, most of the members shown in FIG. 2 are the same as those shown in FIG. 6 and the various members, the operation of electromagnetic clutch, etc. were described in the foregoing description of FIG. 6, and therefore, the members in FIG. 2 are given the reference numeral of the members shown in FIG. 6 and their description is omitted. The bearing 1 shown in FIG. 2 is shown enlarged in FIG. 1(a) and its description will be made later.

In order to solve the aforementioned problems with bearing for pulley of automobile compressor as shown in FIG. 2, the present inventors made various possible counter measures and various experiments on bearings to which these counter measures are applied. As a result, it has been concluded that the double-row bearing 1 having a known configuration as shown in FIG. 1(a), i.e., double-row bearing 1 comprising balls 6, 7 provided in races formed between an inner ring 3 having two rows of inner raceway grooves 2, 2 formed on the outer surface thereof and an outer ring 5 having two rows of outer raceway grooves 4, 4 formed on the inner surface thereof, respectively, wherein the balls 6, 7 in the various rows are retained at an equal interval by retainers 8, 9, respectively, and a grease is retained therein by seals 10, 11 can most effectively be arranged such that the thickness Ti of the bottom of the inner ring, which is the distance between the bottom of the inner raceway grooves 2, 2 of the inner ring 3 and the inner surface of the inner ring 3, is raised from the standpoint of enhancement of rigidity of the bearing. In this experiment, various bearings were evaluated by detecting the amount of noise generated between low temperature state at starting and high temperature operation state because the conditions of all the aforementioned problems with related art bearing can be detected by noise generated by the bearing, i.e., generated amount of noise.

Thus, how the generation of noise changes by changing the thickness of the bottom of the inner ring was studied to know the factor of the bearing on the basis of which the tendency of generation of noise can become a general-purpose index common to the various bearings. As a result of this study, it was found that the diameter of the balls used in this bearing can be applied also to similar bearings as a reference. The general summary of the results of experiments which were made on various bearings on the basis of this conclusion to make clear how noise is generated focusing on the ratio to ball diameter is illustrated in the graph of FIG. 3.

Figure 3:
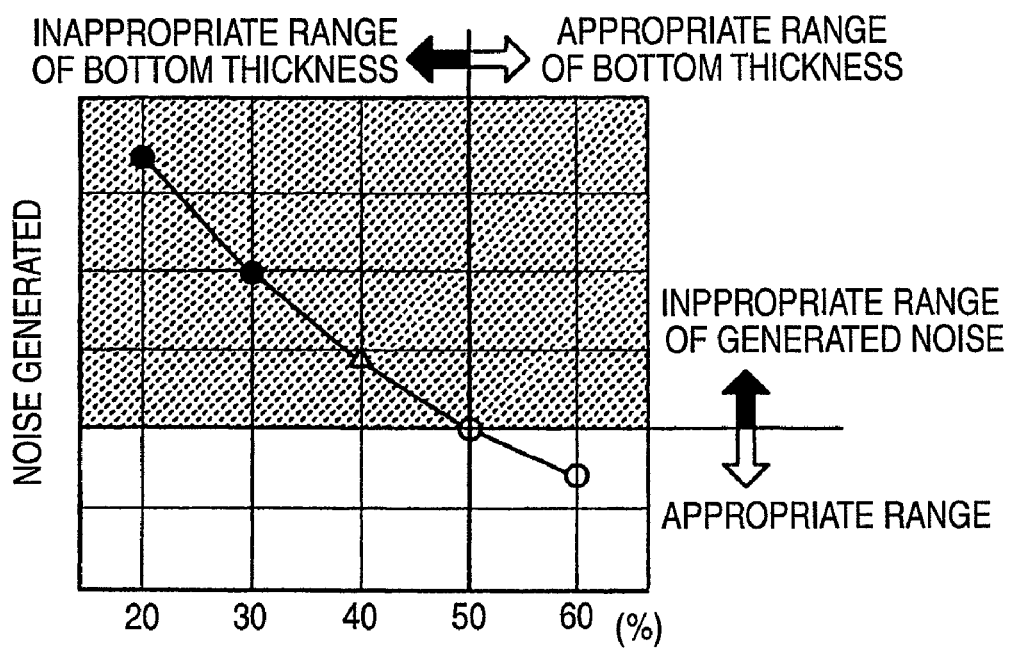
FIG. 3 is a graph illustrating the results of experiments of the present invention.

In the graph shown in FIG. 3, the absolute value of the generated noise on the ordinate differs with, e.g., size of balls in the bearing, inner and outer diameters of bearing, but the tendency shown in the graph is seen whenever the thickness of the bottom of the inner ring is represented by the ratio to ball diameter. As can be seen in the graph, when the thickness of the bottom of the inner ring of the bearing is at least 50% or more as calculated in terms of ratio to ball diameter, noise is less generated, causing no generation of the aforementioned various problems inside the bearing.

Further, as a result of similar experiments made on a known single-row ball bearing 19 comprising an inner ring 13 having a race 12, an outer ring 15 having a race 14, balls 16 disposed interposed between both the two races, a retainer 17 retaining the balls at an equal interval and seals 18, 18 sealing the interior of the bearing as shown in FIG. 1(b) besides the double-row ball bearing as shown in FIGS. 2 and 1(a), it was found that the same tendency as seen with said double-row ball bearing occurs. The summary of the results of the experiments with the level (high, middle, low) of noise are set forth in Table 1 below.

TABLE 1

Ratio of thickness of bottom of inner ring of bearing to ball diameter and generated amount of noise

| Thickness of bottom of inner ring of sample bearing (ratio to ball diameter: %) | Double-row bearing | Single-row bearing |
| --- | --- | --- |
| 20 | X (high level noise) | X (high level noise) |
| 30 | X (high level noise) | X (high level noise) |
| 40 | Δ (middle level noise) | Δ (middle level noise) |
| 50 | ○ (low level noise) | ○ (low level noise) |
| 60 | ○ (low level noise) | ○ (low level noise) |

Further, experiments were made also on the outer ring besides said inner ring under the same conditions, and as a result, it was found that the same tendency occurs with both the double-row bearing and the single-row bearing. This shows that when the thickness of the bottom is predetermined to 50% or more as calculated in terms of ratio to ball diameter, i.e., not smaller then half the radius of the balls used for single-row bearing, double-row bearing and inner and outer rings therefor in common, little noise is generated, making it possible to properly keep the internal clearance of the bearing, the relationship between the inner and outer rings and the supporting member, etc. As the bearing for pulley of engine auxiliary for which the present invention is intended there is mostly used one having an outer diameter of 65 mm or less, but no small-sized bearing having an outer diameter of as small as 65 mm or less and comprising an inner ring and an outer ring having a thick bottom as mentioned above has been known.

While the embodiment illustrated in FIG. 1 shows an example that both the inner ring and the outer ring of the bearing have a bottom thickness of 50% or more as calculated in terms of ratio to ball diameter, the present invention can provide a bearing which is more suitable than the related art bearings even if one of the inner ring and the outer ring (one comprising a mating member having a greater linear expansion coefficient than the bearing member), i.e., only the inner ring or the outer ring meets the aforementioned requirements. Further, the present invention is not limited to the bearing for compressor pulley with electromagnetic clutch as shown in FIG. 2 described above but can be similarly applied to one free of clutch, and the present invention is not limited to the bearing for compressor pulley but can be widely used in bearings for pulley of auxiliary driven by engine. Moreover, the present invention can be similarly applied to the case where the material of the member to which the bearing is fixed is an aluminum alloy or other light alloy or even a resin. Further, the present invention can be similarly applied to ordinary double-row bearings other than the angular bearing as shown in FIG. 1(a) or other various double-row bearings among double-row bearings.

Thus, said first problem of the present invention can be solved, and from other standpoints of view, the present invention means that such a bearing is arranged such that the diameter of the balls is predetermined to 50% or less of the radial section of the bearing and thus is advantageous in that as the diameter of the balls selected decreases, the axial length of the bearing, i.e., degree of freedom of reduction of the width of the bearing increases and the thickness of the inner and outer rings can be raised, making it possible to reduce the deformation of the inner ring and outer rings and hence the clearance of the bearing and the inclination of the bearing at ordinary temperature as compared with the related art.

The use of said bearing makes it possible to solve said problems with the related art and exert various effects, but the actual use of such a bearing as a bearing for pulley of engine auxiliary requires that automobile parts having a smaller size and weight be used to cope with the recent environmental problems, e.g., that compressor for automobile air conditioner be rendered compact by further reducing the axial length thereof.

To this end, as the bearing to be used herein there is often used one having an outer diameter of 65 mm or less, preferably one having a width of 45% or less of the inner diameter thereof, and the use of balls having a diameter of 4 mm or less makes it possible to provide a bearing which is generally more compact.

Further, a bearing for compressor pulley is keenly required to resist moment, and therefore, double-row angular ball bearings, 4-point contact bearings, etc. are used. In order to reduce the axial length, i.e., width of the bearing while thus maintaining the moment resistance of the bearing, the thickness of the bottom of at least one of the aforementioned inner ring and outer ring may be predetermined to 50% or more of the diameter of said balls so that when the thickness of the bottom of the inner and outer rings is about the same as that of the related art bearings, the diameter of the balls can be predetermined smaller accordingly, making it easy to use balls having a diameter of 4 mm or less. By thus reducing the diameter of the balls, the width of the bearing can be predetermined smaller accordingly while taking into account the requirements for moment resistance.

However, the aforementioned double-row angular bearing having an outer diameter of 65 mm or less, a width of 45% or less of the inner diameter thereof and a ball diameter of 4 mm or less wherein at least one of the inner ring and the outer ring has a bottom thickness of 50% or more of the diameter of said balls can be subject to reduction of ball diameter and hence reduction of rated load by the amount of reduction of bearing width and durability deterioration by the amount of reduction of peeling life. This is not limited to bearing for automobile compressor pulley and can apply also to pulley bearing in other various engine auxiliaries.

Accordingly, the second object is to further solve said problems with the pulley bearing that solves the aforementioned first problem of the present invention, that is, to give a higher durability to a bearing for pulley of engine auxiliary having an outer diameter of 65 mm or less, a width of 45% or less of the inner diameter thereof and a ball diameter of 4 mm or less wherein at least one of the inner ring and the outer ring has a bottom thickness of 50% or more of the diameter of said balls. An embodiment of engine auxiliary pulley that solves said second problem will be described hereinafter as a second embodiment in connection with FIGS. 4 and 5.

Figure 4:
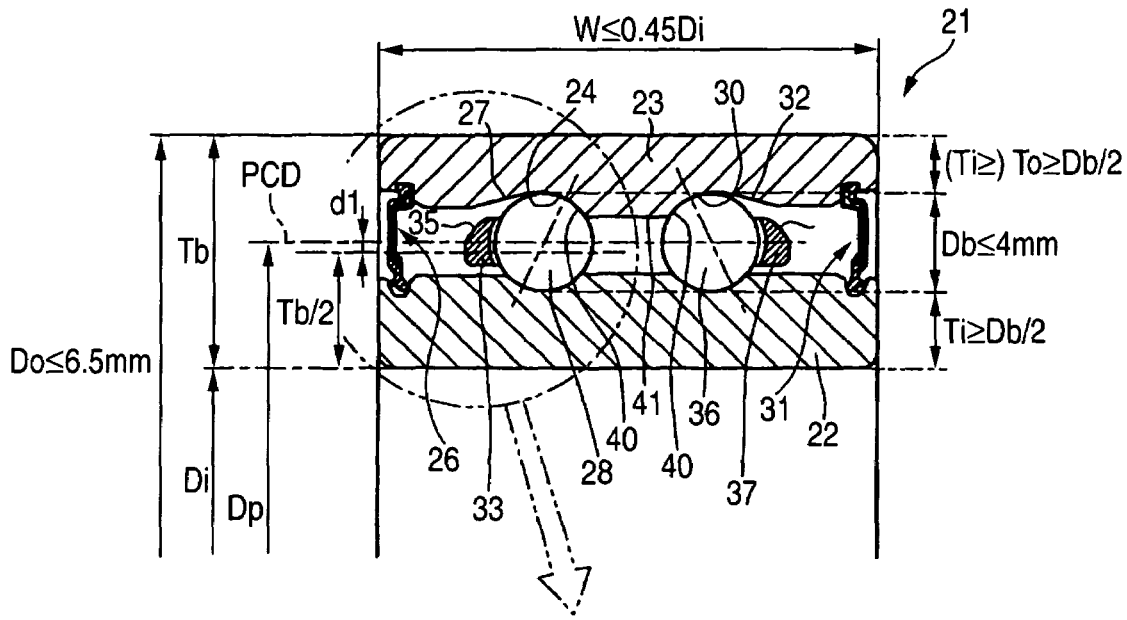
Figure 4:
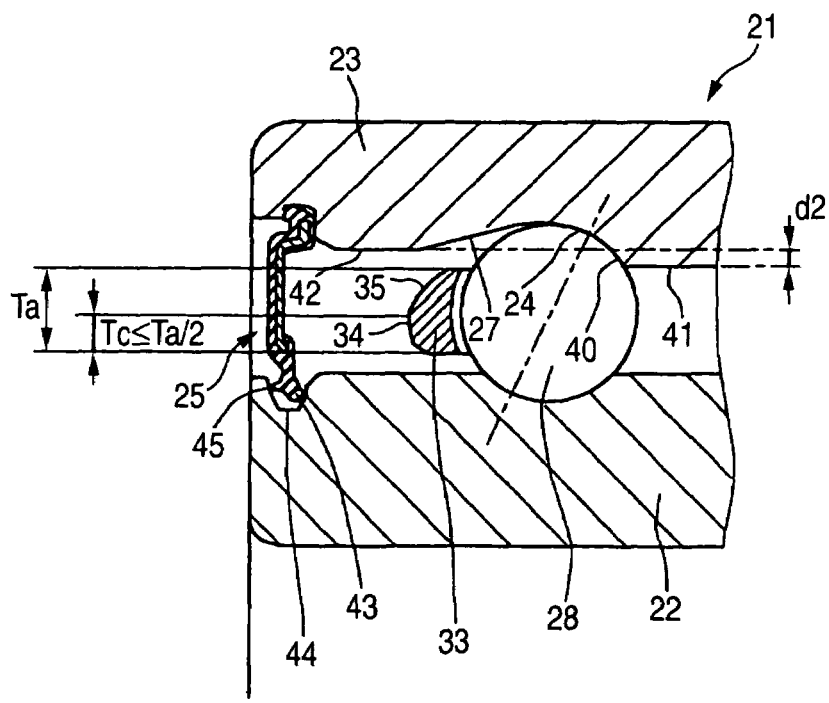
Figure 5:
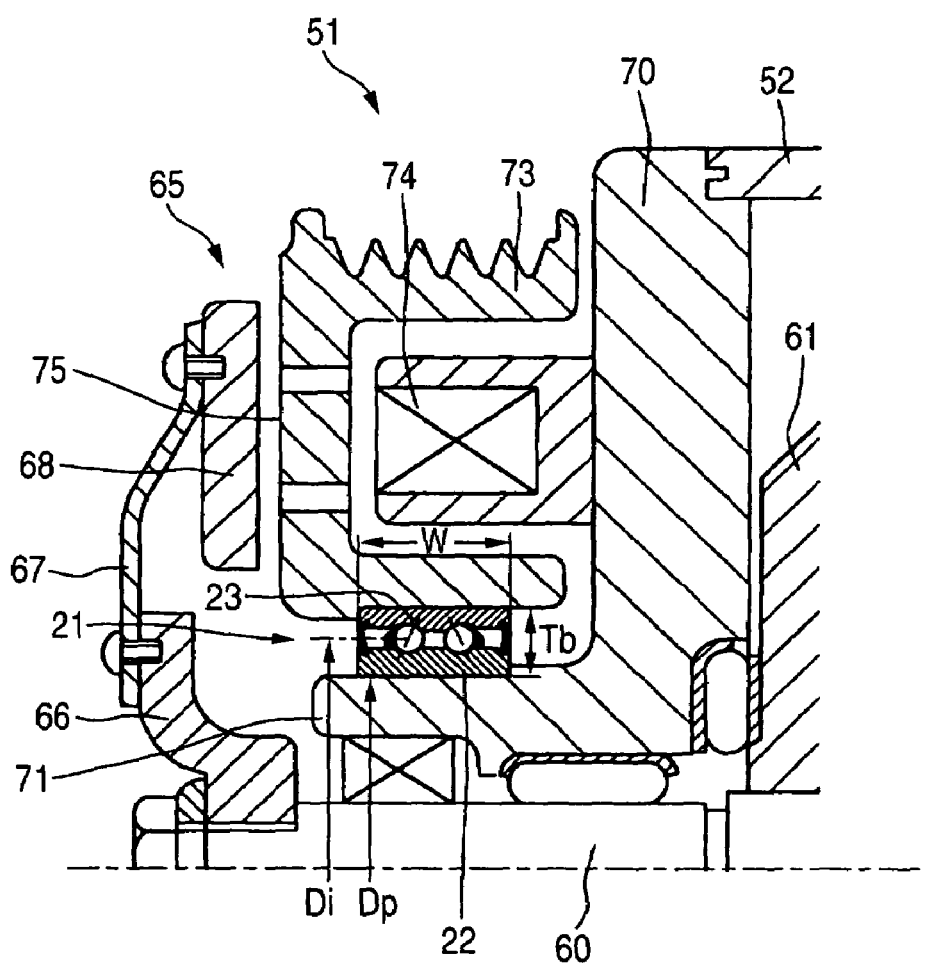
FIG. 5 is a sectional view illustrating an example of the use of the bearing of the second example of the present invention as a bearing for pulley of automobile compressor with electromagnetic clutch.

The bearing of FIG. 4(a), part of which is shown enlarged in FIG. 4(b), illustrates an embodiment of the use of a bearing for engine auxiliary pulley according to the second embodiment of implementation of the present invention as a bearing 21 for compressor pulley, and FIG. 5 illustrates a sectional view of a part of a compressor pulley to which the bearing is applied and its neighborhood. A compressor 51 shown in FIG. 5 and its related members have almost the same configuration as the compressor pulley 51 shown in FIG. 6 mentioned above except the bearing portion and their function has been previously described, and the same members in the compressor of FIG. 5 and its peripheral members as those shown in FIG. 6 are given the same reference numerals and their description are omitted.

As the bearing 21 according to the second embodiment of implementation of the present invention there is used a small-sized double-row angular ball bearing comprising an outer ring 23 having an outer diameter Do of as small as 65 mm or less wherein the axial length, i.e., width W of the bearing is as small as 45% or less of the inner diameter Di of the inner ring 22, balls having a diameter of as small as 4 mm or less are used, the thickness Ti of the bottom of the inner ring 22 or the thickness To of the bottom of the outer ring 23 is predetermined to 50% or more of, i.e., half the ball diameter Db and a plurality of balls are angularly arranged as previously mentioned or as shown in FIG. 4. The embodiment shown in FIG. 4 illustrates an example that both the thickness Ti of the bottom of the inner ring 22 and the thickness To are predetermined greater than half the ball diameter Db.

Such a bearing can be subject to deterioration of life caused by the deterioration of grease life due to the decrease of the encapsulated amount of grease caused by the decrease of the grease-receiving space by the amount of reduction of the width of the bearing as previously mentioned. Further, the bearing can be subject to durability deterioration caused by the deterioration of peeling life due to the reduction of rated load caused by the reduction of the ball diameter.

In order to cope with the aforementioned reduction of the encapsulated amount of grease, a taper surface 27 is formed on the race 24 of the outer ring 23 on the outer side thereof in the width direction of the bearing which is not loaded, i.e., on the side thereof having the seal 26 so that the grease-receiving space is greater than the related art and the grease can be smoothly supplied onto the rolling surface as shown enlarged in FIGS. 4(*a*) and 4(*b*). The angle of the taper surface 27 can be arbitrarily predetermined, and the shape of the taper surface 27 can be arbitrarily predetermined, e.g., by concaving the taper surface 27 so that the grease-receiving space is increased. This approach of forming the taper surface 27 is similarly applied in the form of taper surface 32 to the race 30 on the outer side thereof in the width direction of the bearing which is little loaded, i.e., on the side thereof having the seal 31.

Further, the retainer 33 may have a beveled surface 35 formed on the corner on the outer ring side of the outer surface 34 thereof as shown so that the grease-receiving space can be increased similarly to the taper surface 27 of said outer ring 23 and the grease can be smoothly supplied onto the rolling surface of the balls 28. The shape of the beveled surface 35, too, can be arbitrarily predetermined, and the beveled surface 35 may be subjected to beveling to form a taper surface. This beveling can be similarly applied to the retainer 37 for the other ball 36, and in the embodiment shown in FIG. 4(*a*), it is applied as a beveled surface 38.

Further, in the aforementioned embodiment, the space formed between the taper surface 27 of the outer ring 23 and the beveled surface 35 of the retainer 33 and the space formed between the taper surface 32 and the beveled surface 38 are increased, increasing the space in which grease is supplied onto the rolling surface of the balls and making the supplied surface smooth. Therefore, the grease in the space between the retainer 33 and the seal 26 and the space between the retainer 37 and the seal 31 can be smoothly supplied onto the rolling surface of the balls.

On the other hand, as a countermeasure against the possibility of occurrence of durability problem by the deterioration of peeling life due to the reduction of rated load caused by the reduction of the ball diameter, the inner ring 22 and the outer ring 23 are made of EP steel, which is known as a high cleanness material having an oxygen content of 6 ppm or less. The use of such EP steel makes it possible to drastically prolong the peeling life as compared with the related art bearing steel, etc.

Further, as a countermeasure for enhancing the aforementioned durability, the outer ring 23 is formed having a bottom thickness To of smaller than the thickness Ti of the bottom of the inner ring 22 while meeting the requirement that the thickness To of the bottom of the outer ring 23 is 50% or less of the ball diameter Db, i.e., Db/2 or less as shown in FIG. 4(*a*). As viewed from the inner ring side, the thickness Ti of the bottom of the inner ring 22 is greater than the thickness To of the bottom of the outer ring 23. In this arrangement, PCD formed by the balls 28, 36 of the bearing 21 is deviated from the center of the thickness Tb of the bearing, which is the difference between the outer diameter Do of the outer ring 23 and the inner diameter Di of the inner ring 22, by d1.

As a result, as compared with the related art ordinary compressor pulley bearing in which PCD and the center of the thickness of the bearing coincides with each other, the diameter Dp of PCD can be raised, making it possible to receive the balls 28, 36 by that amount and hence reduce the load imposed on each of the balls, and therefore, the rated load as well as the space volume can be raised, making it possible to enhance the durability of the bearing.

Further, as said counter measure for enhancing durability, the race 24 for the ball 28 in the outer ring 23 extends downward as viewed on the drawing, i.e., toward the interior close to the central axis of the bearing on the loaded side of the race inclined to the crosswise interior of the bearing in the form of angular bearing and the race 30 for the ball 36 shown in FIG. 4(*a*) similarly extends toward the interior close to the central axis on the crosswise inner side of the bearing as shown in FIG. 4(*b*), and as a result, the inner surface 41 between the ball 28 and the ball 36 for the outer ring 23 in the width direction of the bearing is positioned below by d2 as viewed on the drawing from the inner surface 42 disposed on the respective outer side of the ball 28 and the ball 36 in the width direction of the bearing, i.e., at the interior closer to the central axis of the bearing. In this arrangement, a wide race area on which a great load is imposed can be formed on the outer ring, making it possible to enhance the durability of the bearing, and at the same time, the volume of the space can be increased, making it easy for the grease which has gone round to the gap between the seal and the retainer to turn to the interior.

Further, in the bearing according to the aforementioned second embodiment, the inner ring 22 can be predetermined to have a greater thickness, and therefore, the seal groove 44 for forming the seal sliding surface of the inner ring 22 in which the forward end lip 43 of the seal 26 fits in sliding contact or the seal groove 44 for forming a labyrinth with a clearance without contacting the seal can be formed deep or large, making it possible to form a plurality of secondary lips in various forms for arbitrary ones of the three surfaces forming the groove 44, e.g., provide the secondary lip 45 formed on the back surface of the forward end lip 43 of the seal 26 in the direction toward the outer surface of the groove 44 as shown in FIG. 4(*b*) or separately provide a secondary lip which is or is not brought into contact with the groove 44 and making it possible to enhance sealing properties. This makes it assured that the leakage of the grease in the interior can be prevented and the entrance of water, etc. from the exterior can be prevented, making it possible to enhance the durability of the bearing.

The aforementioned various countermeasures for enhancing durability may be individually employed, but some arbitrary ones of these countermeasures may be employed in proper combination, and of course, all these countermeasures may be employed.

As a result of experiments on the aforementioned bearing wherein the curvature of the bearing groove is predetermined to a range of from 51% to 56%, the contact angle of the ball is predetermined to a range of from 5° to 30° and the inner and outer rings and the balls are made of SUJ2 forming material which has been subjected to hardening and annealing as ordinary heat treatment or dimensional stabilization treatment, desired durability was obtained using any of these countermeasures.

The aforementioned bearing of the second embodiment, too, is not limited to the bearing for compressor pulley with electromagnetic clutch as shown in FIG. 5 but can be similarly applied to one free of clutch and further to bearings for pulley of various auxiliaries driven by an engine, even to one fixed to a member made of alloy other than aluminum alloy or even a resin, and the bearing of the second embodiment is not limited to bearings for compressor pulley but can be used as a bearing for pulley of various auxiliaries driven by an engine such as water pump and alternator.

While the present invention has been described in detail and with reference to specific embodiments thereof, it will be apparent to one skilled in the art that various changes and modifications can be made therein without departing from the spirit and scope thereof.

The present application is based on Japanese Patent Application filed on Feb. 12, 2002 (Japanese Patent Application No. 2002-033269), Japanese Patent Application filed on Mar. 29, 2002 (Japanese Patent Application No. 2002-097966) and Japanese Patent Application filed on Dec. 10, 2002 (Japanese Patent Application No. 2002-358783), and its contents are incorporated herein by reference.

INDUSTRIAL APPLICABILITY

In the present invention, even in the case where the linear expansion coefficient of the member in which the inner ring of the bearing is fitted is extremely greater than that of the inner ring of the bearing, the expansive deformation of the inner ring on the mounting member side thereof by expansion at high temperature can be prevented by the enhancement of the rigidity of the inner ring, making it possible to prevent excessive reduction of running clearance developed by the expansive deformation of the inner ring. Further, since it is not necessary that the initial clearance of the bearing be raised as in the related art in order to cope with the aforementioned excessive reduction of running clearance, the generation of noise at low temperature caused by the rise of the initial clearance can be prevented as well.

Moreover, also in the case where the linear expansion coefficient of the member in which the outer ring of the bearing is fitted is extremely greater than that of the outer ring of the bearing, the slippage of the outer ring with the mounting member due to the reduction of interference of the bearing caused by the increase of the inner diameter by the expansion of the outer ring on the mounting member side thereof at high temperature can be prevented, making it possible to prevent the shrinkage deformation of the outer ring during fitting and the shrinkage of the outer ring at extremely low temperature by the enhancement of the rigidity of the outer ring in the case where the interference has been previously raised and hence prevent the reduction of the initial clearance.

Further, by making the minimum value of the thickness of the aforementioned inner ring and the minimum value of the thickness of the outer ring clear, the design of the bearing can be made taking into account the minimum values that solve the aforementioned problems, eliminating the necessity of unnecessarily raising the thickness of the inner ring or the outer ring and hence making it possible to prevent the rise of the size of the bearing.

Moreover, since a bearing for pulley of engine auxiliary is provided comprising an outer ring having an outer diameter of 65 mm or less and a plurality of races fixed to a member having a greater linear expansion coefficient than that of the bearing material, an inner ring having a plurality of races, balls having a diameter of 4 mm or less disposed interposed between the plurality of rows of races on the aforementioned inner ring and outer ring, respectively, a retainer retaining each of the various rows of balls and a seal sealing the interior of the bearing wherein the width of the bearing is 45% or less of the inner diameter of the bearing and the thickness of the bottom of at least one of the aforementioned inner ring and outer ring is 50% or more of the diameter of the aforementioned balls, the deformation by expansion at high temperature on the mounting member side can be prevented by the enhancement of the rigidity of the inner ring and there is no necessity of predetermining excessive clearance at low temperature, making it possible to prevent the generation of noise, enhance durability, reduce the inclination of axis and provide a bearing which is generally small in size and width, even in the case where the linear expansion coefficient of the member in which the inner ring or outer ring of the bearing is fitted is extremely greater than that of the inner ring of the bearing.

In such a small-sized bearing having a small width wherein the pitch diameter of the balls is closer to the outer side of the bearing than to the center of the section of the bearing, balls can be received more in an amount increased by the amount of deviation to reduce the load imposed on each of the balls, making it possible to increase the rated load and hence enhance the durability of the bearing. Further, the bearing made of EP steel having an oxygen content of 6 ppm or less can exhibit a drastically prolonged peeling life as compared with the related art bearing steel, etc. Moreover, the bearing comprising an outer raceway groove having a taper surface provided on the outer side thereof in the width direction of the bearing has a greater grease-receiving space than the related art bearings and allows smooth supply of grease onto the rolling surface of the balls, making it possible to enhance durability and smoothly return the grease which has gone round to the space between the balls and the seal to the space between the balls.

Further, in the bearing wherein the inner side of angularly arranged outer raceway grooves is positioned closer to inside the central axis of the bearing than to the outer side of the outer raceway grooves in the width direction of the bearing, a wide race area on which a great load is imposed can be formed on the outer ring, making it possible to enhance the durability of the bearing. Moreover, in the bearing wherein beveling of the outer back side of the retainer is more than half the section width of the retainer, the grease-receiving space can be raised and the grease can be smoothly supplied onto the rolling surface of the balls, making it possible to enhance the durability of the bearing. Further, in the bearing wherein a seal having a plurality of lips fitted in an inner ring seal groove is provided, the predetermination of a thicker inner ring can be made the use of to form a deep inner ring seal groove, making it easy to provide a plurality of sliding contact or non-sliding contact lips fitted in the inner ring seal groove and hence making it possible to enhance sealing properties. Moreover, this makes it assured that the leakage of internal grease can be prevented, and the entrance of water, etc. from the exterior can be prevented, making it possible to enhance the durability of the bearing.

The invention claimed is:

1. A bearing for pulley of engine auxiliary, comprising:
   an outer ring having an outer diameter of 65 mm or less and a plurality of rows of outer raceway grooves provided on an inner surface thereof;
   an inner ring having two rows of inner raceway grooves provided on an outer surface thereof;
   a plurality of balls having a diameter of 4 mm or less disposed between said plurality of rows of inner raceway grooves of said inner ring and said plurality of rows of outer raceway grooves of said outer ring, respectively;
   a retainer retaining said plurality of balls and a seal sealing the interior of the bearing;
   wherein at least one of said inner ring and said outer ring is fixed to a member having a larger linear expansion coefficient than that of the bearing material;
   a width dimension of the bearing is 45% or less of the inner diameter dimension of the bearing; and
   a thickness of the bottom of at least one of said inner ring and outer ring is 50% or more of the diameter of the balls.

2. The bearing for pulley of engine auxiliary as claimed in claim 1, wherein a pitch circle diameter of said balls is closer to the outer diameter side of the bearing than to the center of the section of the bearing.

3. The bearing for pulley of engine auxiliary as claimed in claim 1, wherein the outer side of said outer raceway groove in the width direction of the bearing is tapered.

4. The bearing for pulley of engine auxiliary as claimed in claim 1, wherein the inner side of said angularly arranged outer raceway grooves in the width direction of the bearing is positioned closer to inside the central axis of the bearing than to the outer side of said outer raceway grooves in the width direction of the bearing.

* * * * *